United States Patent [19]

Karchevski

[11] 4,385,383

[45] May 24, 1983

[54] ERROR RATE DETECTOR

[75] Inventor: Robert A. Karchevski, San Mateo, Calif.

[73] Assignee: GTE Automatic Electric Laboratories, Inc., Northlake, Ill.

[21] Appl. No.: 254,335

[22] Filed: Apr. 14, 1981

[51] Int. Cl.³ .................... G06F 11/00; H04B 17/00
[52] U.S. Cl. .................................... 371/5; 235/92 EC
[58] Field of Search ............... 371/5, 22; 235/92 EC

[56] References Cited

U.S. PATENT DOCUMENTS

| | | | |
|---|---|---|---|
| 3,760,354 | 9/1973 | Ginn | 371/5 |
| 3,824,548 | 7/1974 | Sullivan et al. | 371/22 |
| 3,934,224 | 1/1976 | Dulaney et al. | 371/22 |
| 4,053,751 | 10/1977 | Ault | 371/5 |
| 4,080,589 | 3/1978 | Kline | 371/5 |
| 4,234,963 | 11/1980 | Kline | 371/5 |
| 4,241,445 | 12/1980 | Payer | 371/5 |

Primary Examiner—Charles E. Atkinson
Attorney, Agent, or Firm—Leonard R. Cool

[57] ABSTRACT

One or a burst of error signals from an error detector are applied to one input of a latch. The first error received during a "window" forces the latch to a set position, and a subsequent enabling pulse reads the error occurrence into the count up input of an up-down counter. Following the enable pulse, the latch is reset. If one or more errors occur during the subsequent window period, another error occurrence is read into the count up input. Otherwise, the occurrence of the enable pulse reads the absence of an error into the down count input of said up-down counter. On a full count, an output latch circuit is set by an output signal from the counter. The latch is not reset until a zero count is obtained in the up-down counter. Overflow and underflow are prohibited by circuits external to the up-down counter.

7 Claims, 2 Drawing Figures

ERROR RATE DETECTOR

BACKGROUND OF INVENTION

This invention relates in general to error rate detectors, and in particular to error rate detectors for use in digital transmission equipment.

In digital transmission, the quality or reliability of the transmission system may be expressed in terms of an error rate, i.e., the number of erroneously received digital pulses during a predetermined time interval, which interval is set by the number of bits which are to be error-free and the bit rate. For example, if a 1 in $10^{-6}$ error rate is to be desired, then only one error in every one million error opportunities would be permitted. If there is more than one error in every one million opportunities, an error rate detector should identify this situation by producing an alarm indication.

Many of the techniques used in the prior art are based upon the use of a test signal which is transmitted during an out of service condition. Most often the receiving terminal is arranged to generate a replica of the test signal once the use of a test signal has been identified by the receiver and the test text from the transmitter is synchronized with the replica of the test text locally generated by the receiver. Errors are detected by making a comparison between the binary signal reconstructed at the receiver with that of the replica generated at the receiver. This technique is exemplified by the teaching of U.S. Pat. No. 3,725,860, entitled "Process And Circuit Arrangement For The Measuring Of The Frequency Of Bit Errors And Block Errors With Optional Block Length In The Transmission Of Binary Coded Data Characters," granted Apr. 3, 1973 to J. Kemper et al. As the patentee points out, the measurement of the frequency of error ocurrences uses a standardized test text having a fixed cycle length, such as is recommended by CCITT. This recommended text is pseudo-random text having a length of 511 bits ($2^{-9}-1$ bits). The simplest solution of the measurement of the frequency of block errors results with the standard 511 bit test text, when one selects a block length of 511 bits. The patentee notes that in practice in data transmission systems it is often desirable to use different block lengths than the standard 511 bit length. Therefore, it is necessary in the measurement of the quality of transmission to carry out the measurement of the frequency of errors with different block lengths. This is one of the techniques solved by the patentees and appears to be accomplished by relating the block length to the text in such a way as to be able to obtain block lengths which are different from the standard. Each error whether a single bit or a block error is read directly into an error counter and if the count exceeds that desired for the error rate the error counter will provide an output to an alarm circuit. In contrast, the instant invention teaches a technique for the detection of an error rate during an in service condition. Therefore, a fixed text such as is taught in the referenced patent cannot be used. Further, the error counting arrangement cannot be designed to simply count the errors during the testing period, since the test period is continuous.

SUMMARY OF INVENTION

In response to the first detected input signal of each window, a bistable circuit is forced into its set signal state. A subsequent enabling pulse causes the error condition to effect an upcount in an up-down counter. A reset pulse follows the enabling pulse and, absent an error in the subsequent window, a coincidence of the reset signal state and the enabling pulse occurs, causing a count down in said up-down counter. When a maximum count is obtained, the maximum count signal output forces a second bistable circuit to the set state and the set signal output provides an indication that the window error occurrences in said counter exceed a predetermined number in a predetermined time.

DETAILED DESCRIPTION OF THE INVENTION

Figure 1:
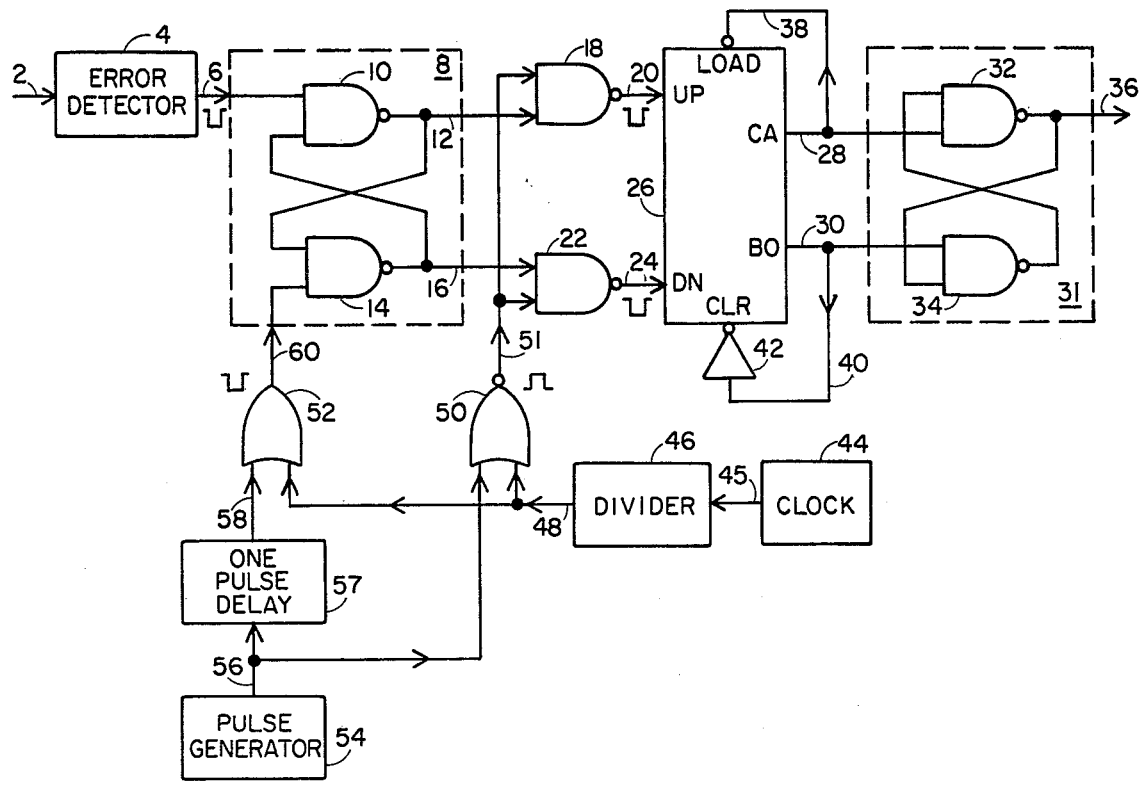
FIG. 1 is a block diagram showing the circuit arrangement used in one embodiment of the invention.

Referring now to FIG. 1, the digital information transmitted from the distant terminal appears on path 2 and is applied to one input of error detector 4. The error detector is shown in representative form only as any error detection technique may be used which will detect single errors or the first error in an error burst, and does not form a part of the instant invention. When an error, or the first error in a burst of errors is detected, an error output signal would be applied to latch 8 on path 6. The presence of the first pulse which appears during a "window", as will be explained later, sets latch 8, i.e., the output of gate 10 on path 12 would be a binary "1". Most often at this point in time, the state on path 51 to the other input of gate 18 is a "0" so that the gate 18 provides a binary "1" output to the up count input of up-down counter 26. Thus in the normal course of events, the fact of the detection of the error occurrence on path 6 is held in abeyance by gate 18 until some future occurrence.

Figure 2:
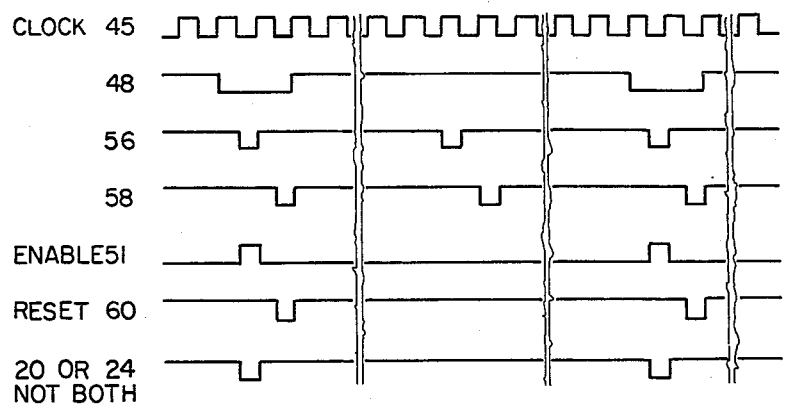
FIG. 2 is a timing diagram which illustrates the waveforms and their timed relationship as are used in different portions of the circuit.

The window is established by the logic and timing circuitry shown in the lower portion of FIG. 1. Clock 44 may be derived from the digital information transmitted from the other terminal. However, as shown in FIG. 2, one clock pulse from clock 44 may occupy 85 time slots (as an example) of the original digital information. This clock pulse is applied via path 45 to divider 46. Both clock 44 and divider 46 may be selected to provide a window of any desired width. For example, if the desired error rate is 1 in $10^{-6}$ then the window would encompass $10^6$ bits. The window is the time period encompassed by successive occurrences of the negative going pulse as shown at waveform 48, FIG. 2. The negative going pulse must itself be of sufficient width so as to enable gates 50 and 52 during a period which includes the original output pulse from pulse generator 54 and the delayed pulse which appears on path 58. As noted above, the window width is determined by the error rate of concern. The width of the negative going pulse (path 48) is selected so as to provide adequate time to enable gates 18 or 22 and then to reset latch 8 as determined by pulses from generator 54. In one embodiment of the invention the negative pulse was selected to have a time interval of 170 time slots. The pulse width of the output signal from pulse generator 54 was selected as 42 time slots and the delay, i.e., the separation between the enable (path 56) and the reset (path 58) pulse, at 43 time slots. It is to be noted that NOR-gate 50 is enabled first which permits the reading of the condition of latch 8 prior to the time that latch 8 is reset by the reset pulse on path 60. It may be seen that an error appearance on path 6 sets latch 8 which applies an error condition to gate 18. The presence of additional detected errors are then not effective in the operation of this error rate detector until latch 8 is reset. Prior to being reset, gate 50 is conditioned to provide an enable pulse output on path 51 by the coincidence of the negative pulse from divider 46 and pulse generator 54. If the latch has been set by a detected error, the error condition is then read into the up-count input of up-down counter 26.

As is well known, NOR-gate 50 will provide a binary "1" output only when both inputs are binary "0". For all other input conditions, the output of gate 50 is binary "0". Also, OR-gate 52 will provide a binary "0" output to reset latch 8 only when both inputs are binary "0". The appearance of a negative pulse on path 48 enables both gates 50 and 52.

The pulse generator 54 generates a pulse signal having a pulse width of approximately 42 bits as shown on path 56 in FIG. 2. As shown, the pulse repetition rate need not be the same as that for the enabling pulse on path 48 but must be such as to occur during the negative excursion of the output on path 48 in order that there might be coincidence. Such a coincidence is shown at both the left and right hand sides of the waveform diagram, FIG. 2, where the appearance of the pulse output from generator 54 coincides with the pulse output from divider 46, permitting a positive pulse to appear at the output of gate 50 on path 51, thus enabling either gate 18 or 22. Note that this sequence of events is important because the fact of an error occurrence as evidenced by an input to gate 18 on path 12 as previously described must be read through gate 18 into the up count input of the up-down counter 26 prior to the the time that latch 8 is reset.

The manner in which the latch is reset is as follows. The output pulse from pulse generator 54 on path 56 is applied to one pulse delay 57. The delayed pulse 58 is then applied to one input of OR-gate 52, and when the delayed pulse and the negative pulse on path 48 are coincident a zero output will be applied on path 60 to gate 14 of latch 8 forcing the latch to reset. The output of gate 52 is shown as waveform 60 in FIG. 2. Once latch 8 is reset, it may again be set by an error occurrence in the next window, and the above sequence will be repeated so that the count in up-down counter 26 will be increased. Of course, if there is no error during the next window, then latch 8 will be in the reset state at the time an enable pulse appears on path 51, causing gate 22 to provide an output signal on path 24 to the down count input of up-down counter 26. This will cause the counter to count down because of the lack of an error occurrence during that window.

It is most often desirable not to have an alarm condition effectuated on the first error output occurrence even though this error occurrence may coincide with the desired error rate. Generally errors are random in nature and may occur in bursts which may spread over several windows and yet not adversely affect the operation of the equipment, because of redundancies or other factors which are built into the digital information transmitted. Thus the selection of the number of cells in the up-down counter depends upon a number of factors such as the number of windows required to establish the actual error rate, the type of counter used, e.g. decade or hexadecimal, and the desired error rate. If 10 windows are adequate to establish the actual error rate a decade counter such as Texas Instruments 74LS192 may be used, whereas the TI 74LS193 may be used if it appears that 16 windows are necessary. The latter, of course, is more accurate. As an example, for a bit rate of 44.736 Mb/s, choosing an error rate of $10^{-6}$ and using a decade counter, if 10 consecutive windows have errors, an error output signal would occur after about 224 milliseconds. However, for an error rate of $10^{-9}$ it would be 224 seconds (over 3 minutes) before the error output signal would appear. Thus, some designs may use a count of say 3 or 5 to reduce the time required to obtain an error output signal. A disadvantage is that the use of the lower count, say 3, could cause an alarm indication, based on a long error burst, if the error rate is low, for example $10^{-5}$ or $10^{-6}$. It is clear from the foregoing discussion that if an error occurs in the first window and no error occurs in the second, that the counter will count up one and then count down one, remaining basically in its same position so long as such a error program continues.

Where a number of errors occur in successive windows, the counter may count up until the extreme count is reached, at which time it generates a pulse which is applied on path 28 to gate 32 of the output latch 31 consisting of gates 32 and 34. This forces latch 31 into the set state which is then applied as an output signal on path 36 to any error indicating equipment that is employed. Because of the use of a latch, this set state will continue until an extreme down count is reached, at which time an output pulse will appear on path 30 to the input of gate 34, resetting the latch 31.

Normally an up-down counter will experience a rollover once an extreme count is achieved. For a maximum count, this is called overflow and for a minimum count this is called underflow. In order to prevent rollover because of an overflow condition, the output pulses on path 28 are applied via path 38 to the load input of the up-down counter. A counter such as the TI 74LS192 has two separate clocking inputs, one of which causes it to count up and the other to count down. By knowing what the maximum count (M-state) of the up-down counter is, the parallel load inputs (one per flip-flop—not shown) are tied to either logic high or logic low so that when a pulse is applied to the load input via path 38, the maximum count less one (M-1) is loaded into the device. As noted above, this up-down counter puts out a pulse on path 28 whenever it reaches the maximum count. If this pulse were not tied to the load input via paths 28 and 38, any additional up count pulses would roll the count over to zero. Therefore, path 38 prevents this by continually loading the maximum less one (M-1) count with each CA output. Similarly, when an excess of pulses to the count down input cause the up-down counter to reach the count of zero, a pulse (BO) is put out which takes the path 40 to inverter 42, the output of which is applied to the clear input of the up-down counter 26. This clears the flip-flops in the up-down counter, maintaining the zero state. Every additional pulse arriving on path 24 generates another BO pulse which again clears the device. Otherwise underflow would occur and it would roll the count over to the maximum count. The up-down counter used here (TI 74LS192) puts out as the BO pulse, the pulse on path 24. Since the CLEAR input overrides all other action in the up-down counter, the counter cannot count until the BO pulse is removed

United States Patent [19]

Rosbury et al.

[11] 4,385,384
[45] May 24, 1983

[54] MODEM DIAGNOSTIC AND CONTROL SYSTEM

[75] Inventors: Arthur H. Rosbury, Plantation, Fla.; Judson T. Gilbert, Newtown, Conn.; Donald C. O'Connor, Miami; Grant A. Newland, Miami Lakes, both of Fla.

[73] Assignee: Racal Data Communications Inc., Miami, Fla.

[21] Appl. No.: 265,175

[22] Filed: May 19, 1981

Related U.S. Application Data

[63] Continuation of Ser. No. 49,338, Jun. 18, 1979, abandoned, which is a continuation of Ser. No. 803,945, Jun. 6, 1977, abandoned.

[51] Int. Cl.³ .................. G06F 11/00; H04M 3/08
[52] U.S. Cl. ........................ 371/22; 179/2 DP; 179/175.3 R; 371/8; 371/15; 375/10
[58] Field of Search ............... 371/8, 15, 20, 22; 370/13, 16; 375/10; 364/200, 900; 340/506, 508, 514, 516; 179/1 C, 2 R, 2 A, 2 DP, 175.3 R, 175.35

[56] References Cited

U.S. PATENT DOCUMENTS

| Re. 30,037 | 6/1979 | Bass | 371/22 |
|---|---|---|---|
| 3,349,374 | 10/1967 | Gabrielson et al. | 375/7 |
| 3,715,723 | 2/1973 | Fletcher et al. | 371/69 |
| 3,806,878 | 4/1974 | Edstrom | 364/200 |
| 3,819,878 | 6/1974 | Pine et al. | 179/175.3 R |
| 3,838,260 | 9/1974 | Nelson | 371/16 |
| 3,943,305 | 3/1976 | Hagedorn | 179/175.3 R |
| 4,006,461 | 2/1977 | Coulter et al. | 340/163 |
| 4,039,751 | 8/1977 | Couturier et al. | 179/175.3 R |
| 4,055,808 | 10/1977 | Holsinger et al. | 375/10 |
| 4,076,961 | 2/1978 | Holsinger et al. | 179/2 DP |
| 4,076,970 | 2/1978 | Lubarsky, Jr. et al. | 364/200 |
| 4,112,264 | 9/1978 | Abramson et al. | 179/175.3 R |

OTHER PUBLICATIONS

Forney, Jr. et al., Multipoint Networks: Advances in Modem Design and Control, 1976 National Telecommunications Conference, Nov.–Dec., 1976, pp. 50.1-1 to 50.1-4.

Primary Examiner—Charles E. Atkinson
Attorney, Agent, or Firm—Jackson, Jones & Price

[57] ABSTRACT

A system for diagnosing and controlling operation of a plurality of modems, some located at a central site and others at various remote sites. A processor located at the central site selectively addresses microprocessor test and control units at each modem over a secondary channel. The microprocessor test and control units respond to commands to configure and perform various modem tests, operate autonomously to monitor various alarm conditions, and format status reports and alarm maydays for transmission back to the central processor. The system is capable of performing a wide variety of testing, monitoring and network control functions for a very large network of modems.

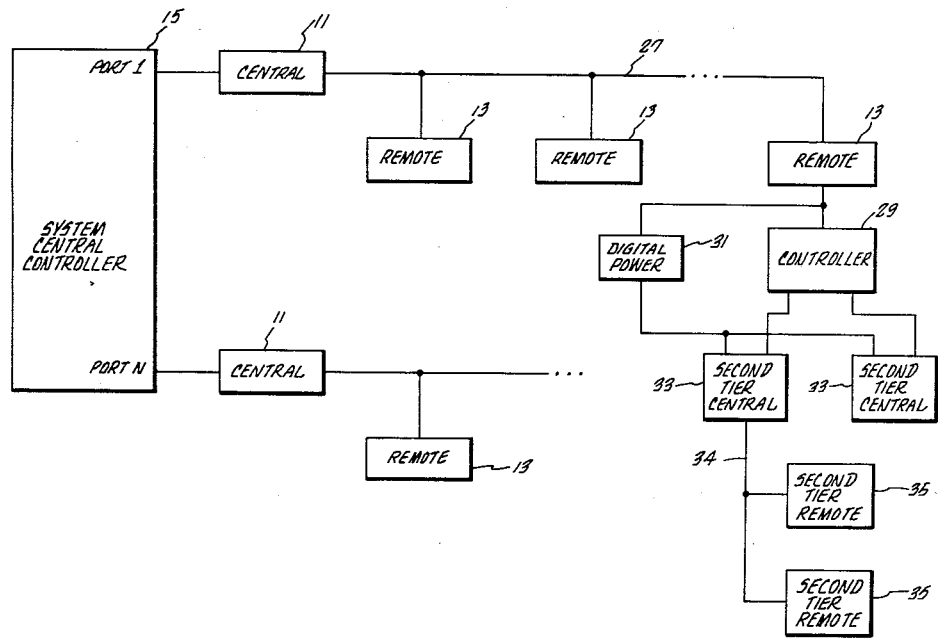

74 Claims, 22 Drawing Figures